(12) United States Patent
Hu et al.

(10) Patent No.: US 12,332,084 B2
(45) Date of Patent: Jun. 17, 2025

(54) ENCODER OUTLET STRUCTURE AND ENCODER

(71) Applicant: Siemens Aktiengesellschaft, Munich (DE)

(72) Inventors: Xian Hui Hu, Tianjin (CN); Andreas Maennl, Nüdlingen (DE); Hai Qiao Feng, Nanjing (CN); Guo Qing Huang, Nanjing (CN); Qi Wang, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 14 days.

(21) Appl. No.: 18/262,663

(22) PCT Filed: Feb. 1, 2021

(86) PCT No.: PCT/CN2021/074710
§ 371 (c)(1),
(2) Date: Jul. 24, 2023

(87) PCT Pub. No.: WO2022/160348
PCT Pub. Date: Aug. 4, 2022

(65) Prior Publication Data
US 2024/0302190 A1   Sep. 12, 2024

(51) Int. Cl.
*G01D 11/26* (2006.01)
*G01D 11/24* (2006.01)

(52) U.S. Cl.
CPC ........... *G01D 11/245* (2013.01); *G01D 11/26* (2013.01)

(58) Field of Classification Search
CPC ............................... G01D 11/245; G01D 11/26
See application file for complete search history.

(56) References Cited

U.S. PATENT DOCUMENTS

| | | | |
|---|---|---|---|
| 2003/0160680 A1 | 8/2003 | Hisamune et al. | 338/162 |
| 2007/0159017 A1* | 7/2007 | Martin | H02K 11/21 |
| | | | 310/216.061 |
| 2022/0384988 A1* | 12/2022 | Feng | H01R 13/5205 |

FOREIGN PATENT DOCUMENTS

| | | |
|---|---|---|
| CN | 102 887 348 | 1/2013 |
| CN | 202 836 589 | 3/2013 |

(Continued)

OTHER PUBLICATIONS

Search Report for International Application No. PCT/CN2021/074710, 10 pages, Sep. 28, 2021.

*Primary Examiner* — Jamel E Williams
(74) *Attorney, Agent, or Firm* — Slayden Grubert Beard PLLC

(57) ABSTRACT

An outlet structure for an encoder includes: an encoder case, a metal ring, a fixing member, and two O-shaped rings. A first cable through-hole is disposed in the encoder case. The metal ring is disposed in the first cable through-hole to clasp a shielding layer of a cable. The fixing member includes a second cable through-hole, and the fixing member fits with interference into the first cable through-hole from an outer side of the encoder case. The first O-shaped ring fits onto the fixing member to seal a slit between the fixing member and the encoder case. The second O-shaped ring in the second cable through hole seals a slit between the fixing member and the cable, and the second O-shaped ring applies an elastic force to the metal ring such that the metal ring remains abutting against the encoder case.

10 Claims, 5 Drawing Sheets

(56) References Cited

FOREIGN PATENT DOCUMENTS

| | | | | |
|---|---|---|---|---|
| CN | 209 200 829 | 8/2019 | | |
| CN | 110 729 598 | 1/2020 | | |
| CN | 111 193 358 | 5/2020 | | |
| DE | 9015056 U1 | 1/1991 | ............. | H01R 13/52 |
| DE | 20004566 U1 | 6/2000 | ............. | H01R 13/52 |
| DE | 10352053 B4 | 5/2006 | ................ | B60L 1/00 |
| JP | 2003217397 A | 7/2003 | ............. | H01C 10/32 |

\* cited by examiner

US 12,332,084 B2

ENCODER OUTLET STRUCTURE AND ENCODER

CROSS-REFERENCE TO RELATED APPLICATIONS

This application is a U.S. National Stage Application of International Application No. PCT/CN2021/074710 filed Feb. 1, 2021, which designates the United States of America, the contents of which are hereby incorporated by reference in their entirety.

TECHNICAL FIELD

The present disclosure relates to an outlet structure. Various embodiments of the teachings herein include outlet structure for an encoder and/or encoders having such an outlet structure.

BACKGROUND

Signal cables of motor encoders impose stricter requirements on sealing and electromagnetic shielding performance, and the signal cables are generally led out by a cable gland. If an installation space reserved in the motor for the encoder is too small, and a minimum bending radius of the cables needs to be satisfied, cable glands with conventional specifications fail to accommodate use requirements.

SUMMARY

The teachings of the present disclosure include outlet structures for an encoder, which is more compact in terms of structure, and provides a greater bending space for cable outlet of the encoder. Some embodiments of the teachings herein include encoders having a more compact outlet structure, which provides a greater bending space for cable outlet of the encoder.

For example, an outlet structure may include: an encoder case, a metal ring, a fixing member, a first O-shaped ring, and a second O-shaped ring. A first cable through hole is disposed in the encoder case, wherein a cable is capable of passing through the first cable through hole. The metal ring is disposed in the first cable through hole and is sleevable onto a shielding layer of the cable, and the metal ring is deformable under an external force to clasp the shielding layer. A second cable through hole is disposed in the fixing member, wherein the cable is capable of passing through the second cable through hole, and the fixing member is insertable with interference into the first cable through hole from an outer side of the encoder case for fixation. The first O-shaped ring is sleeved onto the fixing member, and the first O-shaped ring is capable of sealing a slit between the fixing member and the encoder case after the fixing member is inserted into the first cable through hole. The second O-shaped ring is disposed in the second cable through hole and is sleevable on the cable, and the second O-shaped ring is capable of sealing a slit between the fixing member and the cable, and the second O-shaped ring is also capable of applying an elastic force to the metal ring such that the metal ring remains abutting against the encoder case along an insertion direction of the fixing member.

As another example, some embodiments include an outlet structure for the encoder including the metal ring insertable with interference into the encoder case and capable of clasping the shielding layer. By the fixing member, the outlet structure abuts against the second O-shaped ring and the metal ring to fix the cable to the encoder case, and meanwhile the metal ring abuts against the encoder case to enhance capabilities of shielding electromagnetic interference. The outlet structure further seals, by the first O-shaped ring, the slit between the fixing member and the encoder case, and seals, by the second O-shaped ring, the slit between the fixing member and the cable, thereby achieving an IP67-class sealing effect. The outlet structure according to the present disclosure does not needed to be protruded from the encoder case and is compact in terms of structure, and provides a greater bending space for cable outlet of the encoder.

In some embodiments, the outlet structure further includes an abutting ring. An inner diameter of the abutting ring is less than an outer diameter of the metal ring and an outer ring of the second O-shaped ring. An outer diameter of the abutting ring is greater than the outer diameter of the metal ring and the outer ring of the second O-shaped ring. The abutting ring is disposed in the second cable through hole and is sleeved onto the cable, and the abutting ring is disposed between the second O-shaped ring and the metal ring along the insertion direction of the fixing member. The abutting ring is capable of preventing the second O-shaped ring from sliding inbetween the metal ring and the second cable through hole, thereby improving a sealing effect of the outlet structure.

In some embodiments, an abutting surface perpendicular to the insertion direction of the fixing member and facing towards the outer side of the encoder case is disposed in the first cable through hole of the encoder case, and the second O-shaped ring is capable of applying an elastic force along the insertion direction of the fixing member to the metal ring such that the metal ring remains abutting against the abutting surface. The abutting surface is capable of stably holding and supporting the metal ring, thereby ensuring the metal ring to be stable at its position.

In some embodiments, the fixing member is narrowed at an opening on one end of the second cable through hole to define an abutting portion, a diameter of the second cable through hole at the abutting portion is equal to a diameter of the cable, and the abutting portion is abuttable against the second O-shaped ring along the insertion direction of the fixing member after the fixing member is inserted into the first cable through hole. The abutting portion is capable of narrowing the slit between the fixing member and the cable, and meanwhile the fixing member is capable of uniformly applying a force to the second O-shaped ring by the abutting portion.

In some embodiments, the first cable through hole includes a fixing hole segment, and a section of the fixing hole segment perpendicular to the insertion direction of the fixing member is circular-shaped, wherein a diameter of the section is progressively narrowed along the insertion direction of the fixing member. The structure of the encoder case brings about convenience for manufacturing, and facilitates insertion of the fixing member.

In some embodiments, the fixing member is cone-shaped, and the second cable through hole is coaxial with the fixing member. The structure of the fixing member brings about convenience for manufacturing, and facilitates insertion of the fixing member.

In some embodiments, a first annular groove coaxial with the fixing member is defined on a side surface of the fixing member, and the first O-shaped ring is sleeved into the first annular groove. The first annular groove is capable of preventing the first O-shaped ring from sliding relative to the fixing member after the fixing member is inserted into the first cable through hole, thereby improving the sealing effect of the outlet structure.

In some embodiments, a second annular groove coaxial with the fixing member is defined on the side surface of the fixing member, wherein the second groove and an inner surface of the first cable through hole enclose a sealing chamber after the fixing member is inserted into the first cable through hole. Two communicating grooves are further defined on the side surface of the fixing member, wherein each of the communicating grooves and the inner surface of the first cable through hole enclose a communicating chamber after the fixing member is inserted into the first cable through hole, and each of the communicating chambers communicates the sealing chamber with a surface of the fixing member facing towards the outer side of the encoder case. After the fixing member is inserted into the first cable through hole, a sealant may be injected into the sealing chamber by the communicating chamber, thereby further improving the sealing effect of the outlet structure.

In some embodiments, an outer surface of the encoder case at a periphery of the first cable through hole is a plane perpendicular to an insertion direction of the fixing member, and a surface of the fixing member facing towards the outer side of the encoder case is coplanar with the outer surface of the encoder case after the fixing member is inserted into the first cable through hole. In this way, whether the fixing member is properly mounted may be detected, and an aesthetic appearance of the outlet structure is created.

As another example, an encoder may include a cable and the outlet structure as described above. The cable is capable of passing through the first cable through hole, the metal ring is disposed in the first cable through hole and is sleevable onto the shielding layer of the cable, and the metal ring is deformable under an external force to clasp the shielding layer. The cable is capable of passing through the second cable through hole, the second O-shaped ring is disposed in the second cable through hole and is sleevable onto the cable, and the second O-shaped ring is capable of sealing the slit between the fixing member and the cable. The outlet structure is compact, and provides a greater bending space for cable outlet of the encoder.

BRIEF DESCRIPTION OF THE DRAWINGS

The accompanying drawings are merely for schematic and illustrative description and demonstration of the present disclosure, instead of limiting the scope of the present disclosure.

REFERENCE NUMERALS AND DENOTATIONS THEREOF

Figure 1:
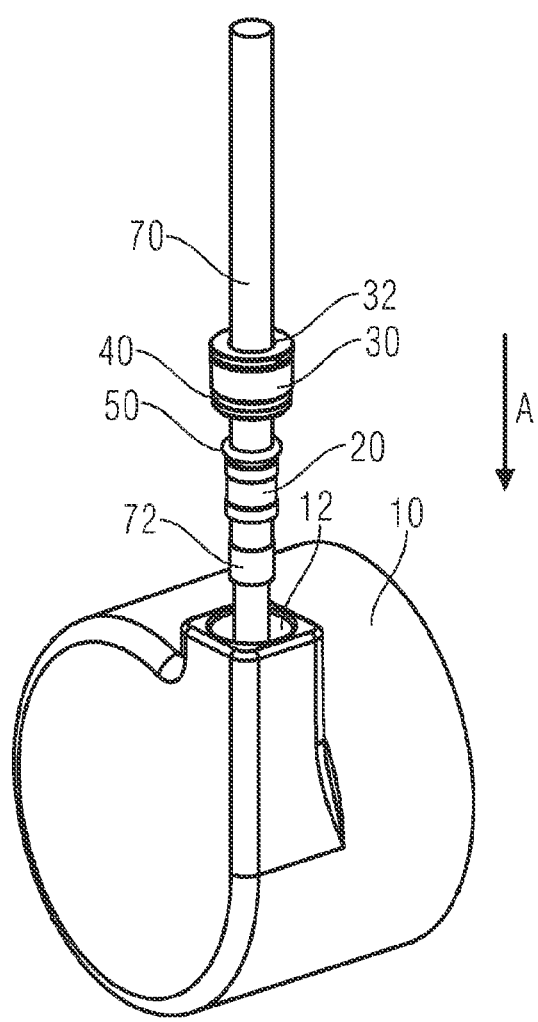
FIG. 1 is a schematic exploded view of an example outlet structure for an encoder incorporating teachings of the present disclosure.

10: encoder case
12: first cable through hole
13: fixing hole segment
14: abutting surface
20: metal ring
30: fixing member
32: second cable through hole
34: abutting portion
35: first annular groove
36: second annular groove
37: sealing chamber
38: communicating groove
39: communicating chamber
40: first O-shaped ring
50: second O-shaped ring
60: abutting ring
70: cable
72: shielding layer
A: insertion direction of the fixing member

DETAILED DESCRIPTION

For clearer descriptions of the technical features, objectives, and the technical effects of the teachings of the present disclosure, the specific embodiments of the present disclosure are hereinafter described with reference to the accompanying drawings.

In the drawings, like reference numerals denote elements having the same structure or having the similar structure but the same function. In this text, the term "exemplary" is used herein to mean "serving as an example, instance, or illustration," and any illustration or embodiment described herein as "exemplary" shall not be necessarily construed as preferred or advantageous over other illustrations or embodiments.

Figure 2:
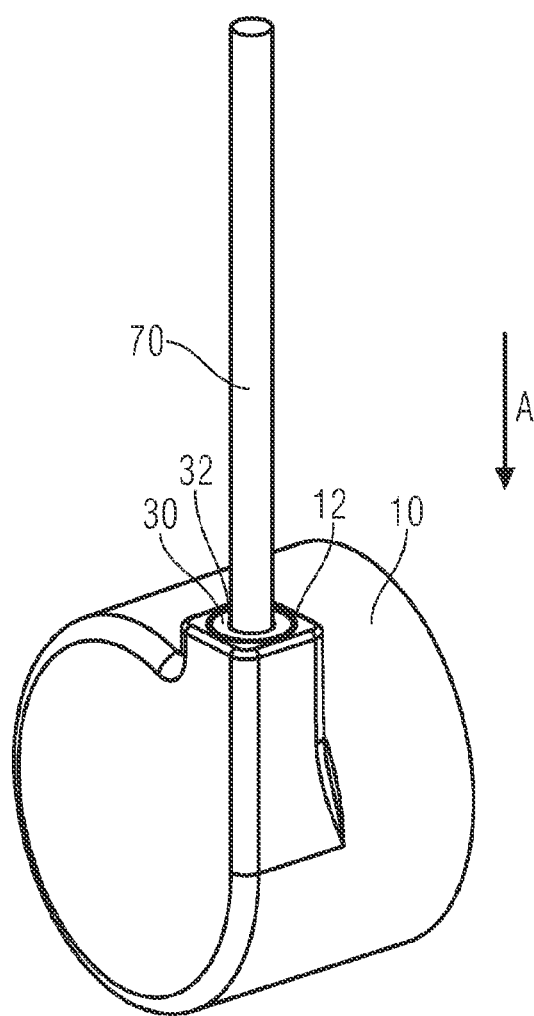
FIG. 2 is a schematic assembly view of an example outlet structure for the encoder incorporating teachings of the present disclosure.

FIG. 1 is a schematic exploded view of an example outlet structure for an encoder incorporating teachings of the present disclosure. FIG. 2 is a schematic assembly view of the outlet structure for the encoder. Referring to FIG. 1 and FIG. 2, the outlet structure for the encoder includes: an encoder case 10, a metal ring 20, a fixing member 30, a first O-shaped ring 40, and a second O-shaped ring 50.

Figure 3:
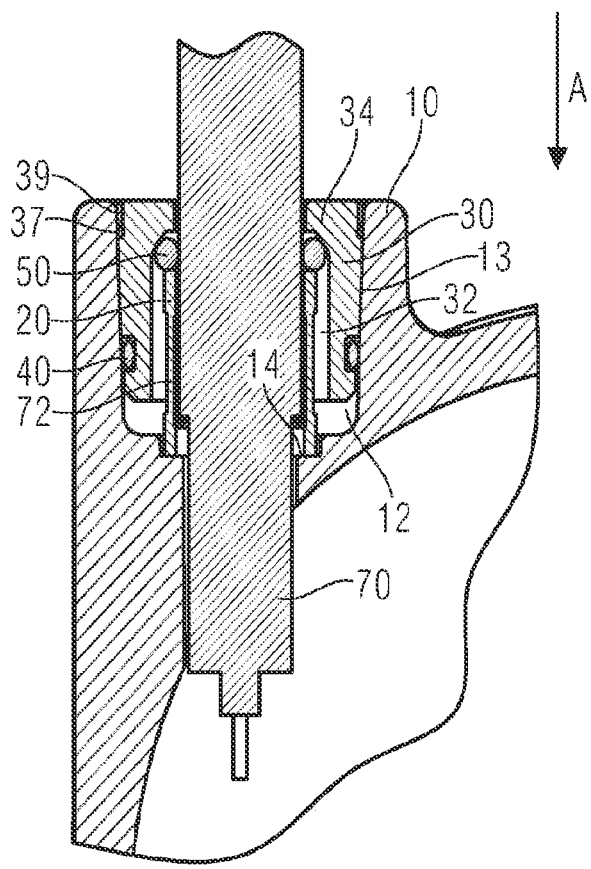
FIG. 3 is a schematic partial sectional view of the outlet structure for the encoder as illustrated in FIG. 2.

FIG. 3 is a schematic partial sectional view of the outlet structure for the encoder as illustrated in FIG. 2. Referring to FIG. 2 and FIG. 3, a first cable through hole 12 is disposed in the encoder case 10, wherein a cable 70 is capable of passing through the first cable through hole 12. The metal ring 20 is disposed in the first cable through hole 12 and is sleevable onto a shielding layer 72 of the cable 70, and the metal ring 20 is made of a soft metal and has a small thickness, such that the metal ring 20 is deformable under an external force to clasp the shielding layer 72.

Referring to FIG. 3, a second cable through hole 32 is disposed in the fixing member 30, wherein the cable 70 is capable of passing through the second cable through hole 32. The fixing member 30 is insertable into the first cable through hole 12 from an outer side of the encoder case 10 along an insertion direction A, and the fixing member 30 is interference fitted with the encoder case 10 and is fixed therewith after being inserted into the first cable through hole 12. The first O-shaped ring 40 is abuttable against the fixing member 30, and after the fixing member 30 is inserted into the first cable through hole 12, the first O-shaped ring 40 is deformable to seal a slit between the fixing member 30 and the encoder case 10, thereby achieving an IP67-class sealing effect.

Referring to FIG. 3, the second O-shaped ring 50 is disposed in the second cable through hole 32 and is sleevable on the cable 70, the second O-shaped ring 50 is deformable to seal a slit between the fixing member 30 and the cable 70, thereby achieving the IP67-class sealing effect. The second O-shaped ring 50 is further capable of applying an elastic force to the metal ring 20 after the fixing member 30 is inserted into the first cable through hole 12, such that the metal ring 20 remains abutting against the encoder case 10 along the insertion direction A of the fixing member 30. In an illustrative embodiment, the second O-shaped ring 50 directly applies a force to the metal ring 20. However, in another illustrative embodiment, the second O-shaped ring 50 may also indirectly apply a force to the metal ring 20 by another part. During use of the encoder, the encoder case 10 may be grounded, and the shielding layer 72 of the cable 70 is connected to the encoder case 10 by the metal ring 20 to achieve grounding, thereby enhancing capabilities of shielding electromagnetic interference.

During assembly of the outlet structure for the encoder, first the first O-shaped ring 40 is sleeved onto the fixing member 30, and then the cable 70 is passed through the fixing member 30, the second O-shaped ring 50, the metal ring 20, and the encoder case 10 in sequence. A force is applied to the metal ring 20, such that the metal ring 20 is deformed to clasp the shielding layer 72. The fixing member 30 is inserted with interference into the first cable through hole 12 for fixation, the first O-shaped ring 40 is capable of sealing the slit between the fixing member 30 and the encoder case 10, and the second O-shaped ring 50 is capable of sealing the slit between the fixing member 30 and the cable 70. Meanwhile, the fixing member 30 abuts against the second O-shaped ring 50 and the metal ring 20 along the insertion direction thereof, such that the metal ring 20 remains abutting against the encoder case 10, thereby fixing the cable 70. The outlet structure according to the present disclosure does not need to be protruded from the encoder case 10, and achieves an IP67-class sealing effect and has capabilities of shielding electromagnetic interference, and thus provides a greater bending space for cable outlet of the encoder.

In some embodiments, such as that shown in FIG. 2 and FIG. 3, an outer surface of the encoder case 10 at a periphery of the first cable through hole 12 is a plane perpendicular to the insertion direction A of the fixing member 30, and a surface of the fixing member 30 facing towards the outer side of the encoder case 10 is coplanar with the outer surface of the encoder case 10 after the fixing member 30 is inserted into the first cable through hole 12. In this way, by observing whether the fixing member 30 protrudes from the encoder case 10, whether the fixing member 30 is properly mounted or slides out is determined. This structure also ensures an aesthetic appearance of the outlet structure.

In some embodiments, such as that shown in FIG. 3, an abutting surface 14 perpendicular to the insertion direction A of the fixing member 30 and facing towards the outer side of the encoder case 10 is disposed in the first cable through hole 12 of the encoder case 10, and the second O-shaped ring 50 is capable of applying an elastic force along the insertion direction A of the fixing member 30 to the metal ring such that the metal ring 20 remains abutting against the abutting surface 14. The abutting surface 14 is capable of stably holding and supporting the metal ring 20, thereby ensuring the metal ring 20 to be stable at its position.

In some embodiments, as shown in FIG. 3, the fixing member 30 is narrowed at an opening on one end of the second cable through hole 32 to define an abutting portion 34, a diameter of the second cable through hole 32 at the abutting portion 34 is equal to a diameter of the cable 70, and the abutting portion 34 is abuttable against the second O-shaped ring 50 along the insertion direction A of the fixing member 30 after the fixing member 30 is inserted into the first cable through hole 12. The abutting portion 34 is capable of narrowing the slit between the fixing member 30 and the cable 70, and meanwhile the fixing member 30 is capable of uniformly applying a force to the second O-shaped ring 50 by the abutting portion 34.

In some embodiments, as shown in FIG. 3, the first cable through hole 12 includes a fixing hole segment 13, wherein a section of the fixing hole segment 13 perpendicular to the insertion direction A of the fixing member 30 is circular-shaped, and a diameter of the section is progressively narrowed along the insertion direction A of the fixing member 30. The structure of the encoder case 10 brings about convenience for manufacturing, and facilitates insertion of the fixing member 30.

Figure 4:
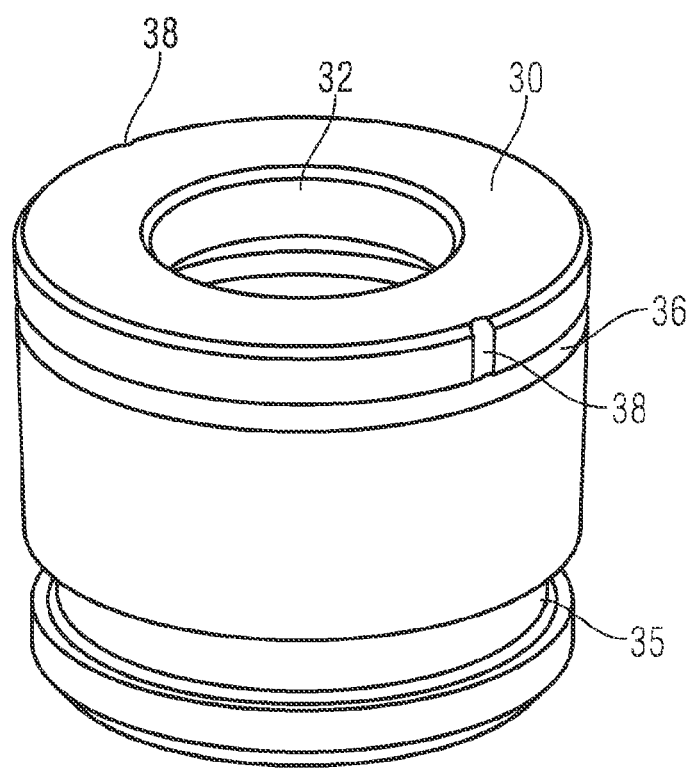
FIG. 4 is a schematic structural view of a fixing member incorporating teachings of the present disclosure.

FIG. 4 is a schematic structural view of an example fixing member. Referring to FIG. 3 and FIG. 4, the fixing member 30 is cone-shaped, and the second cable through hole 32 is coaxial with the fixing member 30. The structure of the fixing member 30 brings about convenience for manufacturing, and facilitates insertion of the fixing member into the first cable through hole 12.

In some embodiments, as shown in FIG. 3 and FIG. 4, a first annular groove 35 coaxial with the fixing member 30 is defined on a side surface of the fixing member 30, and the first O-shaped ring 40 is sleeved into the first annular groove 35. After the fixing member 30 is inserted into the first cable through hole 12, the first annular groove 35 is capable of preventing the first O-shaped ring 40 from sliding relative to the fixing member 30, thereby preventing impacts on the sealing effect. In this way, the sealing effect between the fixing member 30 and the encoder case 10 is improved.

In some embodiments, as shown in FIG. 3 and FIG. 4, a second annular groove 36 coaxial with the fixing member 30 is defined on the side surface of the fixing member 30, wherein the second groove 36 and an inner surface of the first cable through hole 12 enclose a sealing chamber 37 after the fixing member 30 is inserted into the first cable through hole 12. Two communicating grooves 38 are further defined on the side surface of the fixing member 30, wherein each of the communicating grooves 38 and the inner surface of the first cable through hole 12 enclose a communicating chamber 39 after the fixing member 30 is inserted into the first cable through hole 12, and each of the communicating chambers 39 communicates the sealing chamber 37 with a surface of the fixing member 30 facing towards the outer side of the encoder case 10. After the fixing member 30 is inserted into the first cable through hole 12, the sealant may be injected into the sealing chamber 37 by one of the communicating chambers 39, and the other communicating chambers 39 is configured to exhaust the air. After the sealing chamber 37 is full of the sealant, the sealing effect between the fixing member 30 and the encoder case 10 may be improved.

Figure 5:
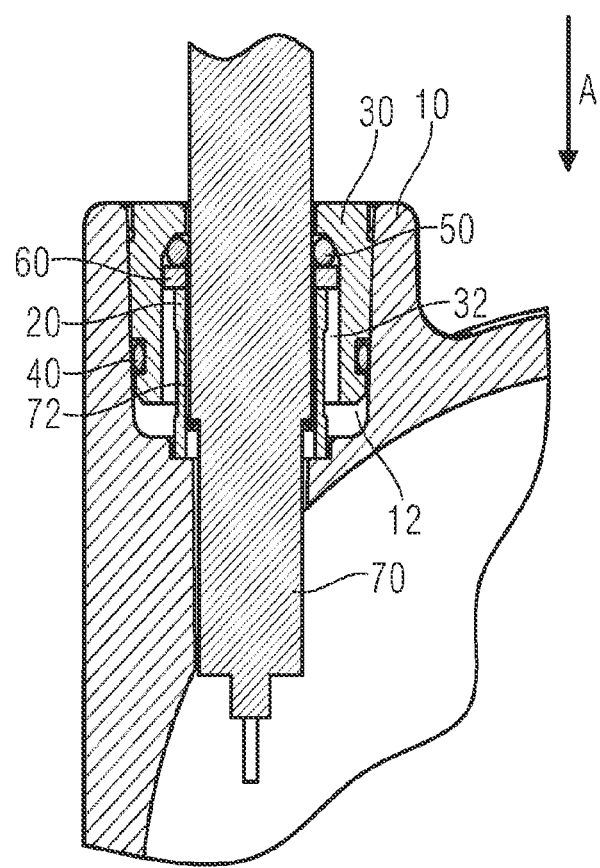
FIG. 5 is a schematic partial sectional view of an example outlet structure for an encoder incorporating teachings of the present disclosure.

FIG. 5 is a schematic partial sectional view of an outlet structure for an encoder incorporating teachings of the present disclosure. Referring to FIG. 5, the identical parts or similar parts of the outlet structure according to this illustrative embodiment over the outlet structure as illustrated in FIG. 3 are not described herein any further. The outlet structure herein further includes an abutting ring 60. An inner diameter of the abutting ring 60 is less than the outer diameter of the metal ring 20 and the outer diameter of the second O-shaped ring 50. An outer diameter of the abutting ring 60 is greater than the outer diameter of the metal ring 20 and the outer diameter of the second O-shaped ring 50.

The abutting ring 60 is disposed in the second cable through hole 32 and is sleevable onto the cable 70, and the abutting ring 60 is disposed between the second O-shaped ring 50 and the metal ring 20 along the insertion direction A of the fixing member 30. The second O-shaped ring 50 is capable of applying an elastic force to the abutting ring 60, such that the abutting ring 60 abuts against the metal ring 20 and thus the metal ring 20 remains abutting against the encoder case 10. The abutting ring 60 is capable of preventing the second O-shaped ring 50 from sliding inbetween the metal ring 20 and the second cable through hole 32, thereby improving the sealing effect of the outlet structure.

Referring to FIG. 1 to FIG. 5, an example encoder includes a cable 70 and the outlet structure as described above. The cable 70 is capable of passing through the first cable through hole 12, the metal ring 20 is disposed in the first cable through hole 12 and is sleevable onto a shielding layer 72 of the cable 70, the metal ring 20 is deformable under an external force to clasp the shielding layer 72, the cable 70 is capable of passing through the second cable through hole 32, the second O-shaped ring 50 is disposed in the second cable through hole 32 and is sleevable onto the cable 70, and the second O-shaped ring 50 is capable of sealing a slit between the fixing member 30 and the cable 70. The outlet structure is more compact, and provides a greater bending space for cable outlet of the encoder.

It should be understood that, although this specification is described based on the embodiments, not each of the embodiments discloses an independent technical solution. Such description manner of the specification is only for clarity. A person skilled in the art should consider the specification as an entirety. The technical solutions according to the embodiments may also be suitably combined to derive other embodiments that may be understood by a person skilled in the art.

A series of detailed descriptions given in this specifically are merely intended to illustrate feasible embodiments of the present disclosure, instead of limiting the protection scope of the present disclosure. Any equivalent embodiments or modifications, for example, combinations, segmentations, or repetition of features, derived without departing from the spirit of the present disclosure shall fall within the protection scope of the present disclosure.

What is claimed is:

1. An outlet structure for an encoder, the structure comprising:
   an encoder case with a first cable through-hole disposed therein, the first cable through-hole allowing a first cable to pass therethrough;
   a metal ring disposed in the first cable through-hole, the metal ring deformable under an external force to clasp a shielding layer of the first cable;
   a fixing member with a second cable through-hole disposed therein, the second cable through-hole allowing the cable to pass therethrough, the fixing member fitting with interference into the first cable through-hole from an outer side of the encoder case for fixation;
   a first O-shaped ring fitting around the fixing member, and fitting within the first cable through-hole to seal a slit between the fixing member and the encoder case; and
   a second O-shaped ring disposed in the second cable through-hole and fitting around the cable, the second O-shaped ring capable of sealing a slit between the fixing member and the cable, and the second O-shaped ring applying an elastic force to the metal ring after the fixing member is inserted into the first cable through hole, such that the metal ring remains abutting against the encoder case.

2. The outlet structure according to claim 1, further comprising an abutting ring;
   wherein an inner diameter of the abutting ring is less than an outer diameter of the metal ring and an outer diameter of the second O-shaped ring;
   an outer diameter of the abutting ring is greater than the outer diameter of the metal ring and the outer diameter of the second O-shaped ring;
   the abutting ring is disposed in the second cable through-hole and fits onto the cable; and
   the abutting ring is disposed between the second O-shaped ring and the metal ring along an insertion direction of the fixing member.

3. The outlet structure according to claim 1, wherein an abutting surface perpendicular to an insertion direction of the fixing member and facing towards the outer side of the encoder case is disposed in the first cable through hole of the encoder case; and
   the second O-shaped ring applies an elastic force along the insertion direction of the fixing member to the metal ring such that the metal ring remains abutting against the abutting surface.

4. The outlet structure according to claim 1, wherein:
   the fixing member narrows at an opening on one end of the second cable through-hole to define an abutting portion;
   a diameter of the second cable through-hole at the abutting portion is equal to a diameter of the cable; and
   the abutting portion is abuttable against the second O-shaped ring along an insertion direction of the fixing member after the fixing member is inserted into the first cable through-hole.

5. The outlet structure according to claim 1, wherein:
   the first cable through-hole comprises a fixing hole segment;
   a section of the fixing hole segment perpendicular to an insertion direction of the fixing member is circular-shaped; and
   a diameter of the section being progressively narrowed along the insertion direction of the fixing member.

6. The outlet structure according to claim 5, wherein:
   the fixing member is cone-shaped; and
   the second cable through-hole is coaxial with the fixing member.

7. The outlet structure according to claim 6, wherein:
   a first annular groove coaxial with the fixing member is defined on a side surface of the fixing member; and
   the first O-shaped ring fits into the first annular groove.

8. The outlet structure according to claim 6, wherein:
   a second annular groove coaxial with the fixing member is defined on the side surface of the fixing member;
   the second groove and an inner surface of the first cable through-hole enclosing a sealing chamber after the fixing member is inserted into the first cable through-hole; and
   two communicating grooves are further defined on the side surface of the fixing member, each of the communicating grooves and the inner surface of the first cable through-hole enclosing a communicating chamber after the fixing member is inserted into the first cable through-hole; and
   each of the communicating chambers communicating the sealing chamber with a surface of the fixing member facing towards the outer side of the encoder case.

9. The outlet structure according to claim 1, wherein:
an outer surface of the encoder case at a periphery of the first cable through-hole is a plane perpendicular to an insertion direction of the fixing member; and
a surface of the fixing member facing towards the outer side of the encoder case is coplanar with the outer surface of the encoder case after the fixing member is inserted into the first cable through-hole.

10. An encoder, comprising:
a cable; and
an outlet structure comprising:
- an encoder case with a first cable through-hole disposed therein, the first cable through-hole allowing a first cable to pass therethrough;
- a metal ring disposed in the first cable through-hole, the metal ring deformable under external force to clasp a shielding layer of the first cable;
- a fixing member with second cable through-hole disposed therein, the second cable through-hole allowing the cable to pass therethrough, the fixing member fitting with interference into the first cable through-hole from an outer side of the encoder case for fixation;
- a first O-shaped ring fitting around the fixing member, and fitting within the first cable through-hole to seal a slit between the fixing member and the encoder case; and
- second O-shaped ring disposed in the second cable through-hole and fitting around the cable, the second O-shaped ring capable of sealing a slit between the fixing member and the cable, and the second O-shaped ring applying an elastic force to the metal ring after the fixing member is inserted into the first cable through hole, such that the metal ring remains abutting against the encoder case;

wherein the cable passes through the first cable through-hole;
the metal ring is disposed in the first cable through-hole and fits onto a shielding layer of the cable;
the metal ring is deformed under an external force to clasp the shielding layer;
the cable passes through the second cable through-hole;
the second O-shaped ring is disposed in the second cable through-hole and fits onto the cable; and
the second O-shaped ring seals a slit between the fixing member and the cable.

* * * * *